United States Patent
Min

(10) Patent No.: US 11,039,047 B2
(45) Date of Patent: Jun. 15, 2021

(54) CAMERA MODULE WITH SHAPE MEMORY ALLOY ACTUATION

(71) Applicant: SAMSUNG ELECTRO-MECHANICS CO., LTD., Suwon-si (KR)

(72) Inventor: Kyoung Joong Min, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 92 days.

(21) Appl. No.: 16/429,837

(22) Filed: Jun. 3, 2019

(65) Prior Publication Data

US 2020/0014824 A1  Jan. 9, 2020

(30) Foreign Application Priority Data

Jul. 9, 2018 (KR) .......................... 10-2018-0079430

(51) Int. Cl.
*H04N 5/225* (2006.01)
*G03B 5/00* (2021.01)
(Continued)

(52) U.S. Cl.
CPC ............. *H04N 5/2252* (2013.01); *G02B 7/04* (2013.01); *G03B 5/00* (2013.01); *H04N 1/00307* (2013.01);
(Continued)

(58) Field of Classification Search
CPC ............. H04N 5/2252; H04N 1/00307; H04N 5/2257; H04N 5/2254; G02B 7/04; G02B 7/026; G02B 7/023; G02B 7/08; G02B 27/646; G02B 7/09; G03B 13/36; G03B 5/00; G03B 2205/0076; G03B 2205/0007
(Continued)

(56) References Cited

U.S. PATENT DOCUMENTS 9,137,429 B2   9/2015 Topliss et al.
2010/0074607 A1*  3/2010 Topliss .................... G02B 7/08
                                                    396/133
(Continued)

FOREIGN PATENT DOCUMENTS

JP   2008-281900 A   11/2008
JP   2017-207734 A   11/2017
(Continued)

*Primary Examiner* — Lin Ye
*Assistant Examiner* — Chan T Nguyen
(74) *Attorney, Agent, or Firm* — NSIP Law

(57) ABSTRACT

A camera module includes a housing having an internal space; a first moving body disposed in the internal space of the housing; a second moving body disposed in an internal space of the first moving body; a first driving member disposed in a space between the housing and the first moving body, and including a first driving wire formed of a shape memory alloy and a first curved elastic wire connected to both ends of the first driving wire; and a second driving member disposed in a space between the first moving body and the second moving body, and including a second driving wire formed of a shape memory alloy and a second curved elastic wire connected to both ends of the driving wire for AF. The first curved elastic wire is in contact with the first moving body and the second curved elastic wire is in contact with the second moving body.

13 Claims, 8 Drawing Sheets

(51) Int. Cl.
*H04N 1/00* (2006.01)
*G02B 7/04* (2021.01)

(52) U.S. Cl.
CPC ... *H04N 5/2257* (2013.01); *G03B 2205/0007* (2013.01); *G03B 2205/0076* (2013.01)

(58) Field of Classification Search
USPC ................................................ 348/373–375
See application file for complete search history.

(56) References Cited

U.S. PATENT DOCUMENTS

2014/0055630 A1* 2/2014 Gregory ............. H04N 5/23258
348/208.2
2017/0289455 A1 10/2017 Hu et al.

FOREIGN PATENT DOCUMENTS

KR 10-1770856 B1 9/2017
WO WO 2011/104518 A1 9/2011

* cited by examiner

CAMERA MODULE WITH SHAPE MEMORY ALLOY ACTUATION

CROSS-REFERENCE TO RELATED APPLICATION

This application claims the benefit under 35 USC 119(a) of Korean Patent Application No. 10-2018-0079430 filed on Jul. 9, 2018 in the Korean Intellectual Property Office, the entire disclosure of which is herein incorporated by reference for all purposes.

BACKGROUND

1. Field

The following description relates to a camera module.

2. Description of Background

Camera modules have been employed in portable electronic devices such as smartphones, tablet PCs, laptops, and the like, and cameras used in mobile terminals may include an autofocusing function, a stabilizing function, a zoom function, and the like.

To implement a variety of functions, however, a structure of a camera module may become complex, and a size of a camera module may also be increased such that a size of a portable electronic device in which a camera module is mounted may need to be increased as well.

With the growth of the smartphone camera market, there have been continuous attempts to reduce and integrate functions of a general manual camera, such as an autofocusing (AF) function, an optical zoom function, and the like, as well as an optical image stabilization (OIS) driving method, and diverse structures of a camera module have been developed. Accordingly, there has been demand for an OIS driving method different from a general OIS method.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having an internal space; a first moving body disposed in the internal space of the housing; a second moving body disposed in an internal space of the first moving body; a first driving member disposed in a space between the housing and the first moving body, and including a first driving wire formed of a shape memory alloy and a first curved elastic wire connected to both ends of the first driving wire; and a second driving member disposed in a space between the first moving body and the second moving body, and including a second driving wire formed of a shape memory alloy and a second curved elastic wire connected to both ends of the second driving wire. The first curved elastic wire is in contact with the first moving body, and the second curved elastic wire is in contact with the second moving body.

The first driving member may move the first moving body by the first curved elastic wire transformed by expansion and contraction of the first driving wire, and the second driving member may move the second moving body by the second curved elastic wire transformed by expansion and contraction of the second driving wire.

The first driving member may include a driving member disposed in contact with a first internal surface of the housing, a driving member disposed in contact with a second internal surface of the housing opposite to the first internal surface, a driving member disposed in contact with a third internal surface of the housing adjacent to the first internal surface, and a driving member disposed in contact with a fourth internal surface of the housing opposite to the third internal surface.

The camera module may include a first support bar in contact with the second driving member and disposed on a first external surface of the second moving body, and a second support bar in contact with the second driving member disposed on a second external surface of the second moving body opposite to the first external surface.

The second driving member may include a driving member in contact with the first support bar, and a driving member in contact with the second support bar.

The camera module may include a ball member disposed on at least one external surface of the second moving body other than the first external surface and the second external surface.

The ball member may be inserted into a guide member disposed on the at least one external surface of the second moving body.

The first support bar may be disposed in an upper portion of the first external surface of the second moving body, the second support bar may be disposed in a lower portion of the second external surface of the second moving body, the driving member in contact with the first support bar may be in contact with a lower surface of the first support bar, and the driving member in contact with the second support bar may be in contact with an upper surface of the second support bar.

The camera module may include a mounting port for installation of the first driving member disposed on an internal surface of the housing.

In another general aspect, a camera module includes a housing; a first moving body disposed in an internal space of the housing; a second moving body disposed in an internal space of the first moving body; a first driving member disposed in a space between the housing and the first moving body, and including a first driving wire formed of a shape memory alloy and a first elastic wire connected to both ends of the first driving wire; and a second driving member disposed in a space between the first moving body and the second moving body, and including a second driving wire formed of a shape memory alloy and a second elastic wire connected to both ends of the second driving wire. The first driving member moves the first moving body by the first elastic wire transformed by expansion and contraction of the first driving wire, and the second driving member moves the second moving body by the second elastic wire transformed by expansion and contraction of the second driving wire.

In another general aspect, a camera module includes a housing; a first moving body disposed in the housing; a second moving body including lenses and disposed in an internal space of the first moving body; a first driving member disposed in a space between the housing and the first moving body and in contact with four internal surfaces of the housing to move the first moving body in a first direction perpendicular to an optical axis direction and a second direction perpendicular to the optical axis direction and the first direction; and a second driving member disposed in a space between the first moving body and the second moving body and in contact with two external surfaces of the second moving body to move the second moving body in the optical axis direction.

The second moving body may include a first support bar disposed on a first external surface and a second support bar disposed on a second external surface opposite to the first external surface, and the second driving member may include a first member to contact the first support bar to move the second moving body in the optical axis direction and a second member to contact the second support bar to move the second moving body in the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
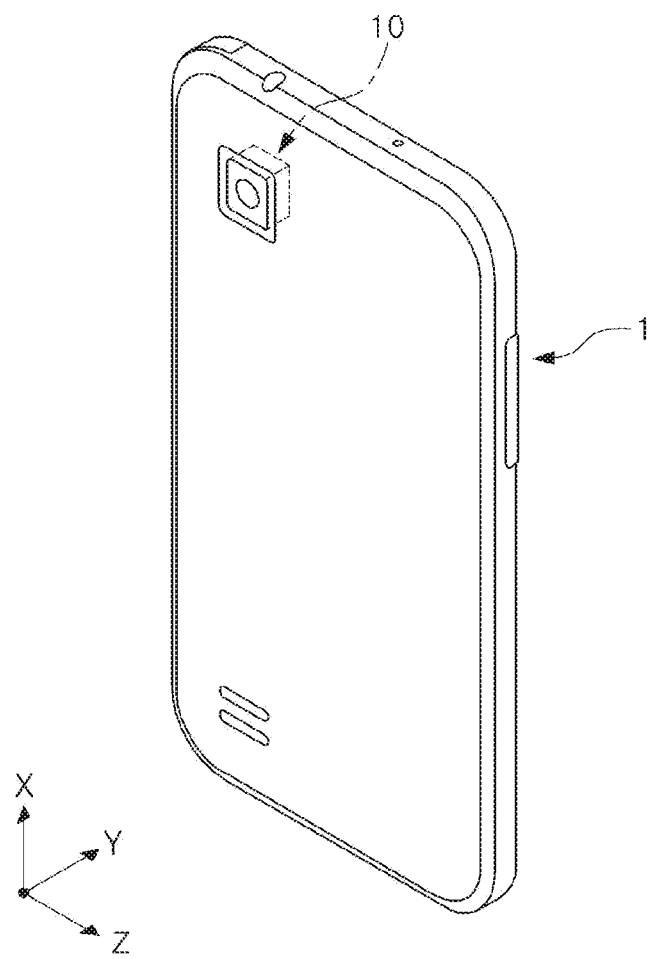
FIG. 1 is a perspective diagram illustrating a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

FIG. 1 is a perspective diagram illustrating a portable electronic device according to an example.

Referring to FIG. 1, a portable electronic device 1 may be implemented as a mobile communication terminal device, a smartphone, a tablet PC, and the like, on which a camera module 10 is mounted.

As illustrated in FIG. 1, the portable electronic device 1 may include the camera module 10 to image a subject.

The camera module 10 may include a plurality of lenses, and an optical axis (Z axis) of a lens may be oriented in a thickness direction (a Y axis direction, a direction towards a rear surface of the portable electronic device 1 from a front surface or the opposite direction) of the portable electronic device 1.

In the camera module 10, an optical image stabilization (OIS) function or an autofocusing (AF) function may be executed by a driving member for OIS 140 (see FIGS. 2 to 4) and a driving member for AF 150 (see FIGS. 2 to 4), which will be described in the description below.

Figure 2:
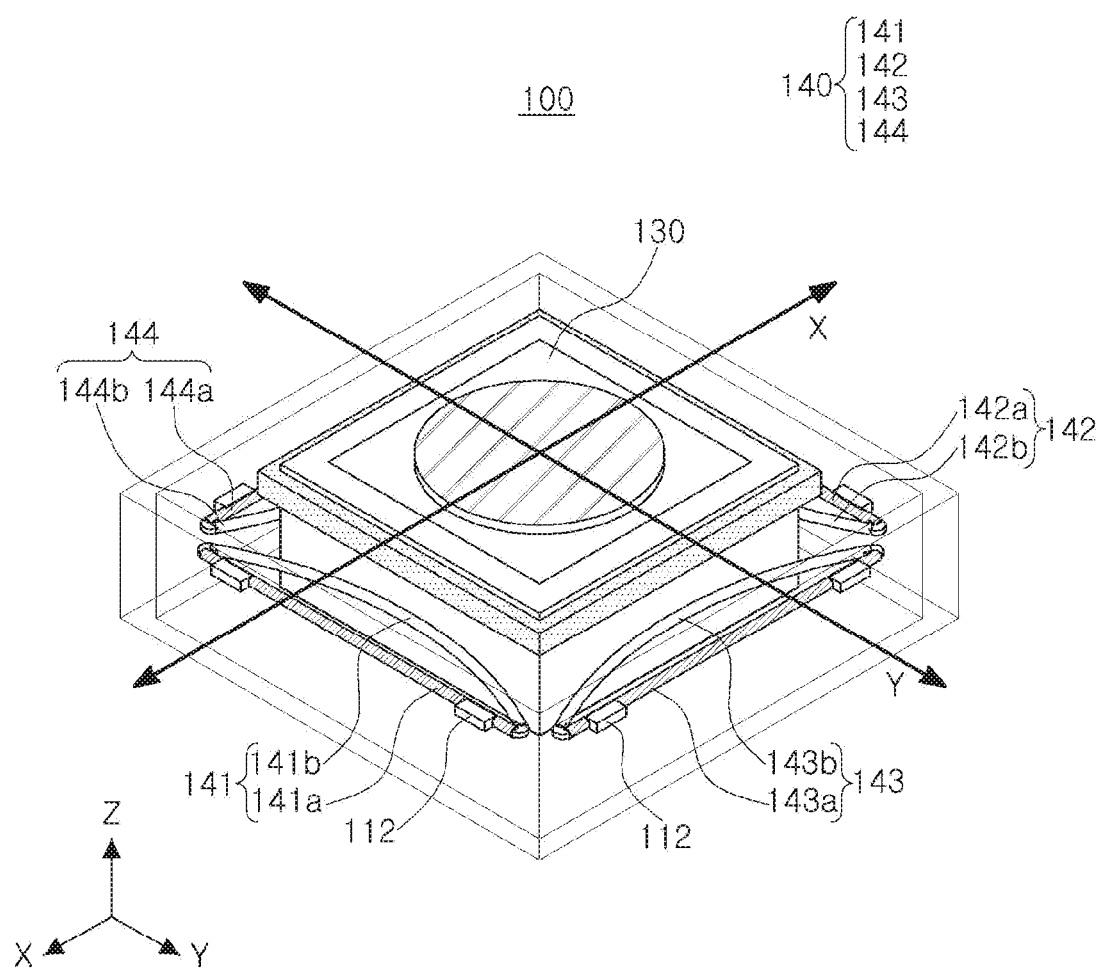
FIG. 2 is a schematic diagram illustrating a camera module according to an example.
Figure 3:
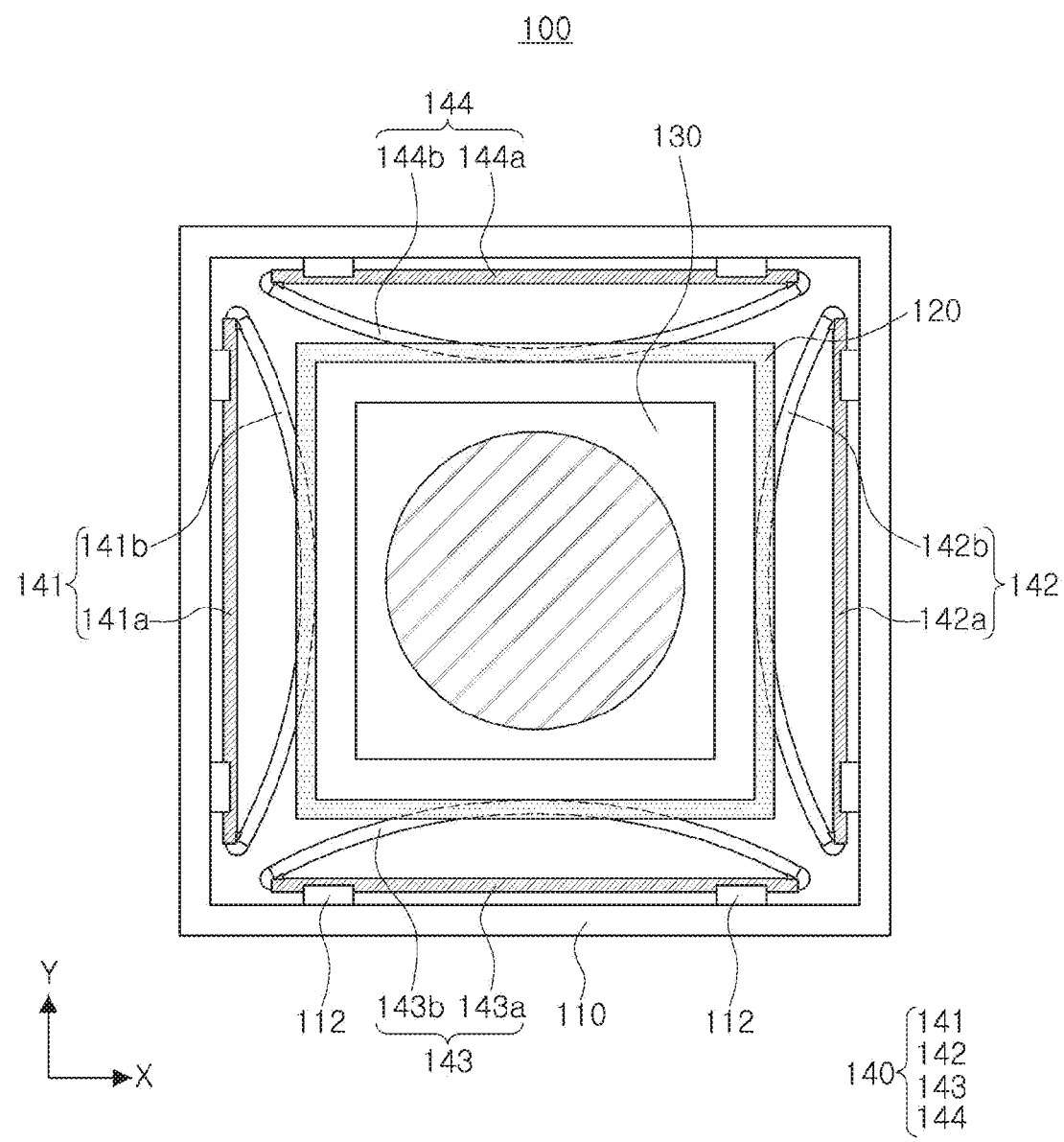
FIG. 3 is a plan diagram illustrating a camera module according to an example.
Figure 4:
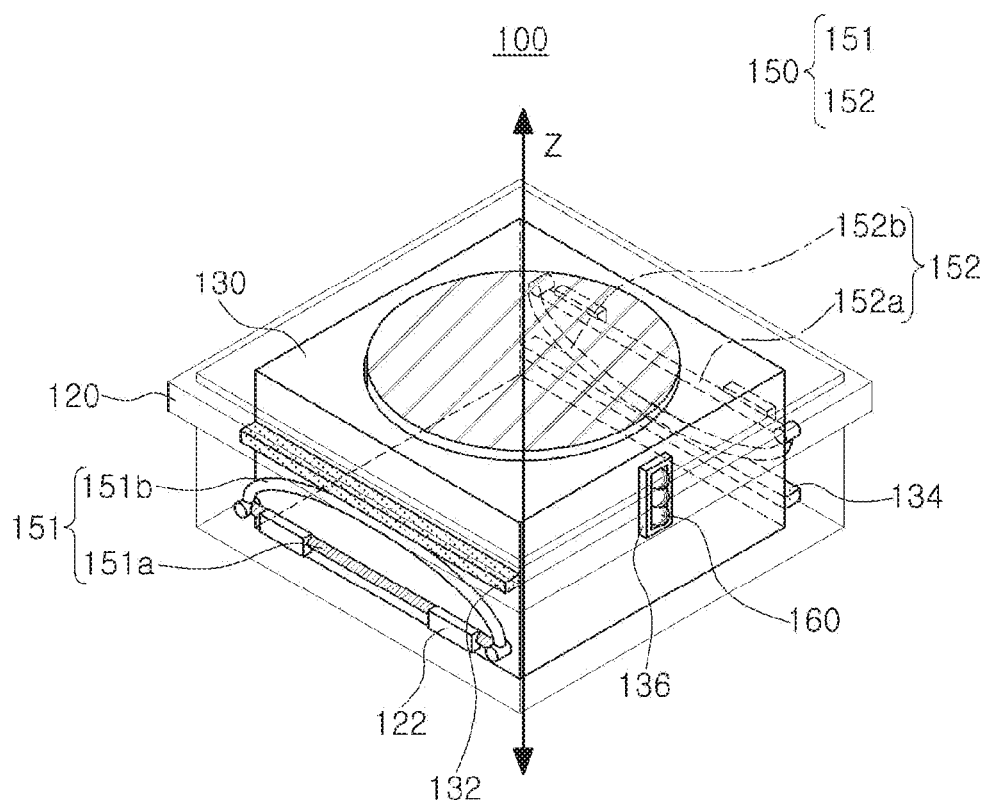
FIG. 4 is a schematic perspective diagram illustrating a first moving body, a second moving body, and a driving member for autofocusing (AF) of a camera module according to an example.
Figure 5:
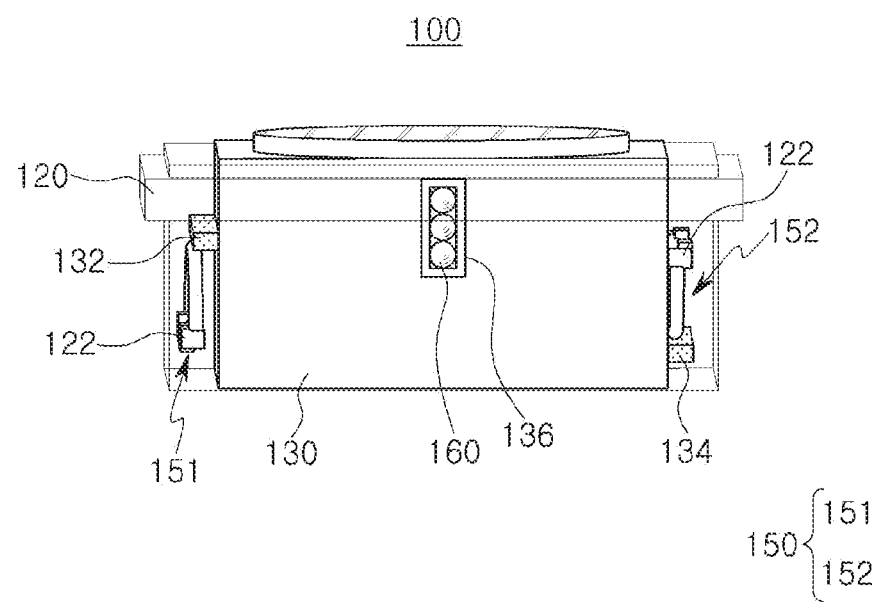
FIG. 5 is a diagram illustrating a first moving body, a second moving body, and a driving member for AF of a camera module according to an example, viewed from the front.

FIG. 2 is a schematic diagram illustrating a camera module according to an example. FIG. 3 is a plan diagram illustrating a camera module according to an example. FIG. 4 is a schematic perspective diagram illustrating a first moving body, a second moving body, and a driving member for AF of a camera module according to an example. FIG. 5 is a diagram illustrating a first moving body, a second moving body, and a driving member for AF of a camera module according to an example, viewed from the front.

Referring to FIGS. 2 to 5, a camera module 100 may include a housing 110, a first moving body 120, a second moving body 130, a driving member for OIS 140, and a driving member for AF 150.

The housing 110 may have an internal space, and may have a hexahedral shape. An opening (not illustrated) may be formed on a bottom surface of the housing 110. First mounting ports 112 for installation of the driving member for OIS 140 may be disposed on four side surfaces among internal surfaces of the housing 110. The driving member for OIS 140 may be mounted on the first mounting ports 112 and may expand and contract on the first mounting ports 112.

The first moving body 120 may be installed in the housing 110 and may move in an internal space of the housing 110. As an example, the first moving body 120 may move in two axis directions (e.g., X axis and Y axis) in an internal space of the housing 110. The first moving body 120 may have an approximately hexahedral shape.

Second mounting ports 122 for installation of the driving member for AF 150 may be provided on an internal surface of the first moving body 120.

The second moving body 130 may be installed in the first moving body 120 such that the second moving body 130 may move in one axis direction (e.g., Z axis) with reference to the first moving body 120. As an example, a first support bar 132 for supporting the driving member for AF 150 may be provided on one side surface among external surfaces of the second moving body 130, and a second support bar 134 for supporting the driving member for AF 150 may be provided on another side surface of the second moving body 130 that is opposite the side surface of the second moving body 130 on which the first support bar 132 is provided. The first support bar 132 may be disposed on an upper end of one side surface of the second moving body 130, and the second support bar 134 may be disposed on a lower end of the other side surface of the second moving body 130. A guide member 136 guiding a ball member 160 may be provided on remaining side surfaces of the second moving body 130 (side surfaces of the second moving body not including the first support bar 132 and the second support bar 134) for smooth movement of the second moving body 130.

A plurality of lenses (not illustrated) may be installed in the second moving body 130.

The driving member for OIS 140 may be disposed in a space between the housing 110 and the first moving body 120. The driving member for OIS 140 may be in contact with four side surfaces among internal surfaces of the housing 110 and four side surfaces among external surfaces of the first moving body 120. As an example, the driving member for OIS 140 may include a first driving member for OIS 141 disposed in contact with a first side surface among internal surfaces of the housing 110, a second driving member for OIS 142 disposed on a second side surface opposite to the first side surface, among internal surfaces of the housing 110 to oppose the first driving member for OIS 141, a third driving member for OIS 143 disposed on a third side surface adjacent to the first side surface among internal surfaces of the housing 110, and a fourth driving member for OIS 144 opposing the third driving member for OIS 143.

The first driving member for OIS 141 may include a first driving wire for OIS 141a formed of a shape memory alloy, and a first elastic wire for OIS 141b having a curved shape and connected to both ends of the first driving wire for OIS 141a. Ends of the first driving wire for OIS 141a may be in contact with ends of the first elastic wire for OIS 141b. A maximum contraction rate of the first driving wire for OIS 141a may be approximately 2.2%. As an example, when the first driving wire for OIS 141a is 8 mm, a maximum stroke (a maximum moving distance of the first moving body 120) may be 834 μm, and when the first driving wire for OIS 141a is 5 mm, a maximum stroke (a maximum moving distance of the first moving body 120) may be 521 μm. Thus, a maximum stroke may be increased as compared to a stroke in a general camera module (that is, 230 μm).

The first elastic wire for OIS 141b may be disposed in contact with the first moving body 120, and the first driving wire for OIS 141a may be disposed in contact with an internal surface (the first side surface) of the housing 110.

The second, third, and fourth driving members for OIS 142, 143, and 144 may also include second, third, and fourth driving wires for OIS 142a, 143a, and 144a each formed of a shape memory alloy, and second, third, and fourth elastic wires for OIS 142b, 143b, and 144b each having a curved shape and connected to ends of the respective second, third, and fourth driving wires for OIS 142a, 143a, and 144a.

A method of driving the first moving body 120 will be described with reference to FIGS. 6 and 7.

Figure 6:
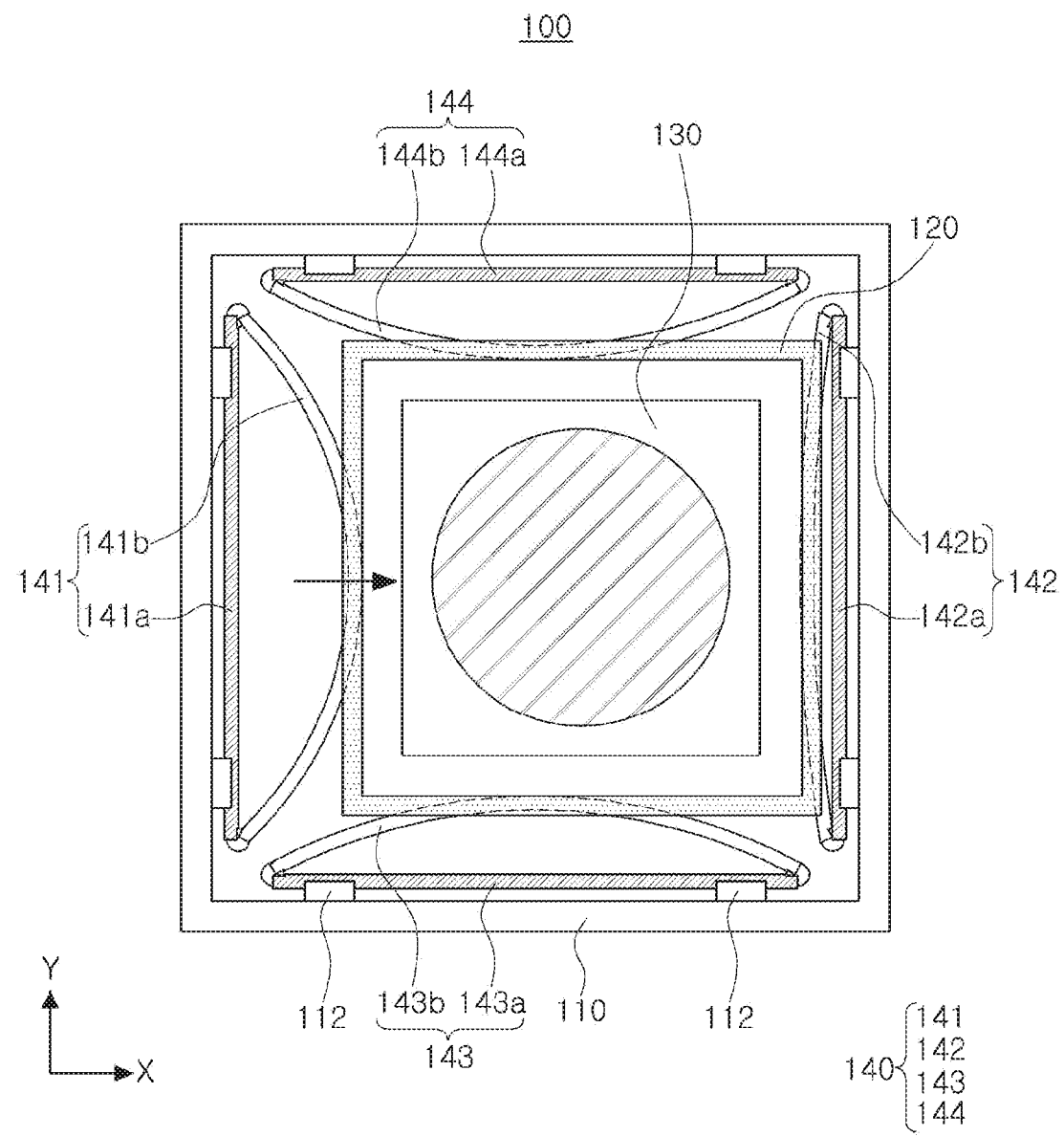
FIGS. 6 to 7 are diagrams illustrating operations of a first moving body of a camera module according to an example.

A driving method to move a first moving body 120 to the right side of an X axis as illustrated in FIG. 6 will be described. To move the first moving body 120 to the right side of an X axis, a first driving member for OIS 141 may contract. The first elastic wire for OIS 141b may form an arc having a diameter less than a diameter of an initially formed arc (for example, an arc of the first elastic wire for OIS 141b as shown in FIG. 3). The first elastic wire for OIS 141b may be bent in a direction opposite to the first driving wire for OIS 141a. Accordingly, the deformed first elastic wire for OIS 141b may deliver driving force to one side surface of the first moving body 120 such that the first moving body 120 may move to the right side of an X axis. The second driving member for OIS 142 may expand. The second elastic wire for OIS 142b may form an arc having a diameter greater than a diameter of an initially formed arc (for example, an arc of the second elastic wire for OIS 142b as shown in FIG. 3). The second elastic wire for OIS 142*b* may be bent in a direction towards the second driving wire for OIS 142*a*.

When the first moving body 120 is moved in the X axis direction, the third and fourth driving members for OIS 143 and 144 may maintain an initial state without affecting the movement of the first moving body 120 in an X axis direction.

A driving method to move the first moving body 120 to the left side of an X axis will be described. To move the first moving body 120 to the left side of an X axis, the second driving member for OIS 142 may contract. The second elastic wire for OIS 142*b* may form an arc having a diameter less than a diameter of an initially formed arc. The second elastic wire for OIS 142*b* may be bent in a direction opposite to the second driving wire for OIS 142*a*. Accordingly, the deformed second elastic wire for OIS 142*b* may deliver driving force to a side surface of the first moving body 120 such that the first moving body 120 may move to the left side of an X axis. The first driving member for OIS 141 may expand. The first elastic wire for OIS 141*b* may form an arc having a diameter greater than a diameter of an initially formed arc. The first elastic wire for OIS 141*b* may be bent in a direction towards the first driving wire for OIS 141*a*.

When the first moving body 120 is moved in the X axis direction, the third and fourth driving members for OIS 143 and 144 may maintain an initial state without affecting the movement of the first moving body 120 in an X axis direction.

Figure 7:
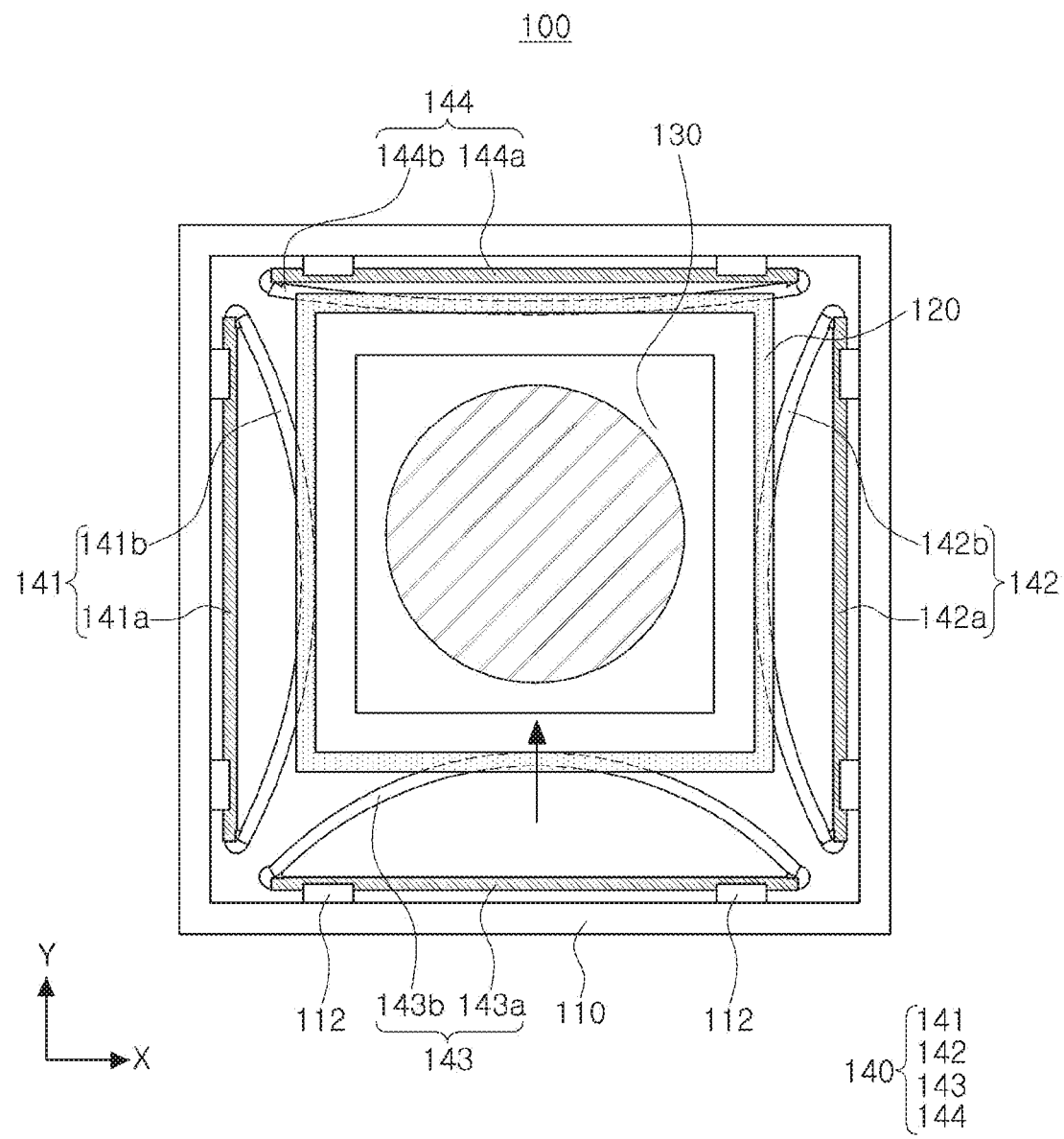

A driving method to move the first moving body 120 upwardly in a Y axis as illustrated in FIG. 7 will be described. To move the first moving body 120 upwardly of a Y axis, the third driving member for OIS 143 may contract. The third elastic wire for OIS 143*b* may form an arc having a diameter less than a diameter of an initially formed arc (for example, an arc of the third elastic wire for OIS 143*b* as shown in FIG. 3). The third elastic wire for OIS 143*b* may be bent in a direction opposite to the third driving wire for OIS 143*a*. Accordingly, the deformed third elastic wire for OIS 143*b* may deliver driving force to a side surface of the first moving body 120 such that the first moving body 120 may move upwardly in an Y axis direction. The fourth driving member for OIS 144 may expand. The fourth elastic wire for OIS 144*b* may form an arc having a diameter greater than a diameter of an initially formed arc (for example, an arc of the fourth elastic wire for OIS 144*b* as shown in FIG. 3). The fourth elastic wire for OIS 144*b* may be bent in a direction towards the fourth driving wire for OIS 144*a*.

When the first moving body 120 is moved in the Y axis direction, the first and second driving members for OIS 141 and 142 may maintain an initial state without affecting the movement of the first moving body 120 in a Y axis direction.

A driving method to move the first moving body 120 downwardly in a Y axis direction will be described. To move the first moving body 120 downwardly in a Y axis direction, the fourth driving member for OIS 144 may contract. The fourth elastic wire for OIS 144*b* may form an arc having a diameter less than a diameter of an initially formed arc. The fourth elastic wire for OIS 144*b* may be bent in a direction opposite to the fourth driving wire for OIS 144*a*. Accordingly, the deformed fourth elastic wire for OIS 144*b* may deliver driving force to a side surface of the first moving body 120, such that the first moving body 120 may move downwardly in a Y axis direction. The third driving member for OIS 143 may expand. The third elastic wire for OIS 143*b* may form an arc having a diameter greater than a diameter of an initially formed arc. The third elastic wire for OIS 143*b* may be bent in a direction towards the fourth driving wire for OIS 144*a*.

When the first moving body 120 is moved in the Y axis direction, the first and second driving members for OIS 141 and 142 may maintain an initial state without affecting the movement of the first moving body 120 in a Y axis direction.

Referring back to FIGS. 4 and 5, the driving member for AF 150 may be disposed in a space between the first moving body 120 and the second moving body 130, and may move the second moving body 130 in a Z axis direction. The driving member for AF 150 may include a first driving member for AF 151 in contract with the first support bar 132 of the second moving body 130, and a second driving member for AF 152 in contact with the second support bar 134 of the second moving body 130.

The first driving member for AF 151 may include a first driving wire for AF 151*a* formed of a shape memory alloy, and a first elastic wire for AF 151*b* having a curved shape and connected to ends of the first driving wire for AF 151*a*. Ends of the first driving wire for AF 151*a* may be in contact with ends of the first elastic wire for AF 151*b*. A maximum contraction rate of the first driving wire for AF 151*a* may be approximately 2.2%. The first elastic wire for AF 151*b* may be in contact with a lower surface of the first support bar 132.

The second driving member for AF 152 may also include a second driving wire for AF 152*a* formed of a shape memory alloy, and a second elastic wire for AF 152*b* having a curved shape and connected to ends of the second driving wire for AF 152*a*. The second elastic wire for AF 152*b* may be in contact with an upper surface of the second support bar 134.

In the description below, a method of driving the second moving body 130 will be described with reference to FIGS. 8 and 9.

Figure 8:
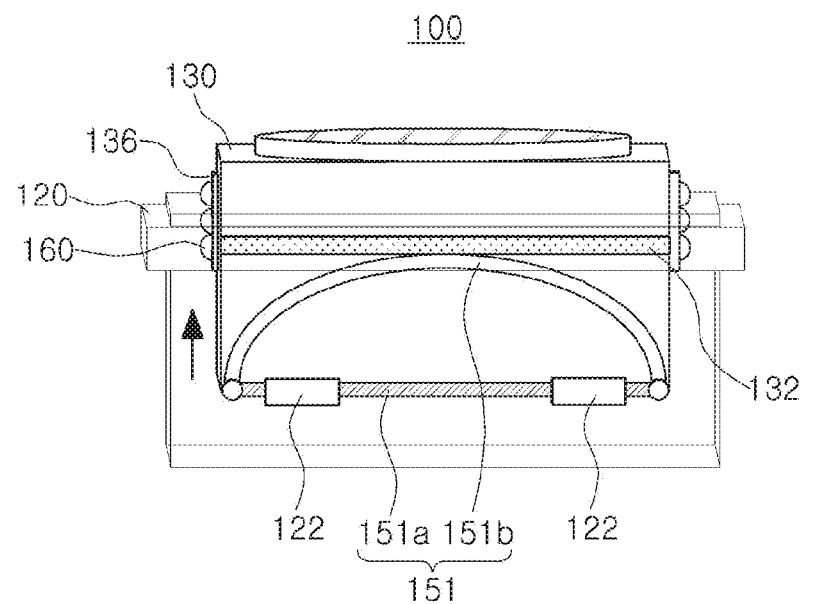
FIGS. 8 to 9 are diagrams illustrating operations of a second moving body of a camera module according to an example.
Figure 8:
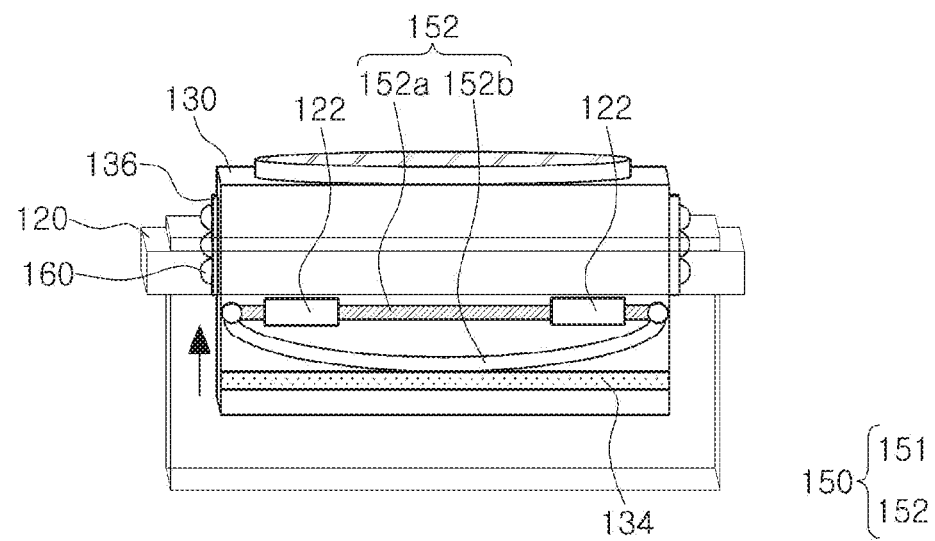

A driving method to move the second moving body 130 upwardly in a Z axis direction as illustrated in FIG. 8 will be described. To move the second moving body 130 upwardly of a Z axis direction, the first driving member for AF 151 may contract. The first elastic wire for AF 151*b* may form an arc having a diameter less than a diameter of an initially formed arc (for example, an arc of the first elastic wire for AF 151*b* as shown in FIG. 4). The first elastic wire for AF 151*b* may be bent in a direction opposite to the first driving wire for AF 151*a*. The deformed first elastic wire for AF 151*b* may deliver driving force to the first support bar 132 such that the second moving body 130 may move upwardly in a Z axis direction. The second driving member for AF 152 may expand. The second elastic wire for AF 152*b* may form an arc having a diameter greater than a diameter of an initially formed arc (for example, an arc of the second elastic wire for AF 152*b* as shown in FIG. 4). The second elastic wire for AF 152*b* may be bent in a direction towards the second driving wire for AF 152*a*.

Figure 9:
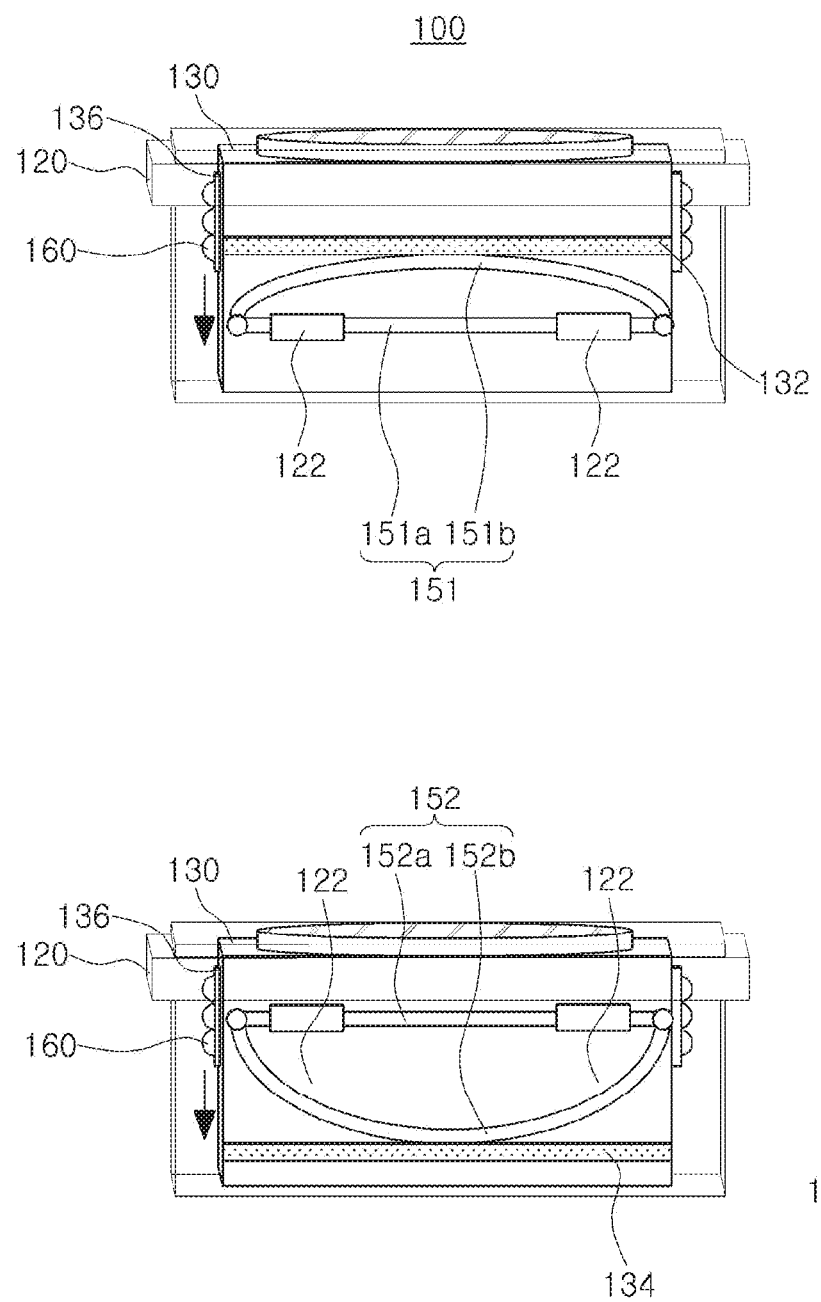

A driving method to move the second moving body 130 downwardly in a Z axis direction as illustrated in FIG. 9 will be described. To move the second moving body 130 downwardly in a Z axis direction, the second driving member for AF 152 may contract. The second elastic wire for AF 152*b* may form an arc having a diameter less than a diameter of an initially formed arc (for example, an arc of the second elastic wire for AF 152*b* as shown in FIG. 4). The second elastic wire for AF 152*b* may be bent in a direction opposite to the second driving wire for AF 152*a*. The deformed second elastic wire for AF 152*b* may deliver driving force to the second support bar 134 such that the second moving body 130 may move downwardly in a Z axis direction. The first driving member for AF 151 may expand. The first driving member for AF 151 may expand. The first elastic wire for AF 151*b* may form an arc having a diameter greater than a diameter of an initially formed arc (for example, an arc of the first elastic wire for AF 151*b* as shown in FIG. 4). The first elastic wire for AF 151*b* may be bent in a direction towards the first driving wire for AF 151*a*.

As described above, a sufficient stroke (a moving distance) of the first and second moving bodies 120 and 130 may be secured through the driving member for OIS 140 and the driving member for AF 150.

Also, by reducing the number of shape memory alloys, power consumption may be reduced.

Further, as the driving wire formed of a shape memory alloy is connected to the elastic wire, damages caused by external impacts may be prevented.

Additionally, by reducing the number of the driving wires formed of a shape memory alloy, control operations may easily be performed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a housing comprising an internal space;
a first moving body disposed in the internal space of the housing;
a second moving body disposed in an internal space of the first moving body;
a first driving member configured to move the first moving body along a first direction perpendicular to an optical axis direction and along a second direction perpendicular to the optical axis direction and the first direction, the first driving member being disposed in a space between the housing and the first moving body, and comprising a first driving wire formed of a shape memory alloy and a first curved elastic wire connected to both ends of the first driving wire; and
a second driving member disposed in a space between the first moving body and the second moving body, and comprising a second driving wire formed of a shape memory alloy and a second curved elastic wire connected to both ends of the second driving wire,
wherein the first curved elastic wire is in contact with the first moving body, and the second curved elastic wire is in contact with the second moving body.

2. The camera module of claim 1,
wherein the first driving member is configured to move the first moving body by the first curved elastic wire transformed by expansion and contraction of the first driving wire, and
wherein the second driving member is configured to move the second moving body by the second curved elastic wire transformed by expansion and contraction of the second driving wire.

3. The camera module of claim 1, wherein the first driving member comprises a driving member disposed in contact with a first internal surface of the housing, a driving member disposed in contact with a second internal surface of the housing opposite to the first internal surface, a driving member disposed in contact with a third internal surface of the housing adjacent to the first internal surface, and a driving member disposed in contact with a fourth internal surface of the housing opposite to the third internal surface.

4. The camera module of claim 1, further comprising a first support bar in contact with the second driving member and disposed on a first external surface of the second moving body, and a second support bar in contact with the second driving member disposed on a second external surface of the second moving body opposite to the first external surface.

5. The camera module of claim 4, wherein the second driving member comprises a driving member in contact with the first support bar, and a driving member in contact with the second support bar.

6. The camera module of claim 5,
wherein the first support bar is disposed in an upper portion of the first external surface of the second moving body, and the second support bar is disposed in a lower portion of the second external surface of the second moving body, and
wherein the driving member in contact with the first support bar is in contact with a lower surface of the first support bar, and the driving member in contact with the second support bar is in contact with an upper surface of the second support bar.

7. The camera module of claim 4, further comprising a ball member disposed on at least one external surface of the second moving body other than the first external surface and the second external surface.

8. The camera module of claim 7, wherein the ball member is inserted into a guide member disposed on the at least one external surface of the second moving body.

9. The camera module of claim 1, further comprising a mounting port for installation of the first driving member disposed on an internal surface of the housing.

10. A camera module, comprising:
a housing;
a first moving body disposed in an internal space of the housing;
a second moving body disposed in an internal space of the first moving body;
a first driving member configured to move the first moving body along a first direction perpendicular to an optical axis direction and along a second direction perpendicular to the optical axis direction and the first direction, the first driving member being disposed in a space between the housing and the first moving body, and comprising a first driving wire formed of a shape memory alloy and a first elastic wire connected to both ends of the first driving wire; and
a second driving member disposed in a space between the first moving body and the second moving body, and comprising a second driving wire formed of a shape memory alloy and a second elastic wire connected to both ends of the second driving wire, wherein the first driving member is configured to move the first moving body by the first elastic wire transformed by expansion and contraction of the first driving wire, and wherein the second driving member is configured to move the second moving body by the second elastic wire transformed by expansion and contraction of the second driving wire.

11. A camera module, comprising:

a housing;

a first moving body disposed in the housing;

a second moving body comprising lenses and disposed in an internal space of the first moving body;

a first driving member disposed in a space between the housing and the first moving body and in contact with four internal surfaces of the housing, and configured to move the first moving body along a first direction perpendicular to an optical axis direction and along a second direction perpendicular to the optical axis direction and the first direction; and a second driving member disposed in a space between the first moving body and the second moving body and in contact with two external surfaces of the second moving body, and configured to move the second moving body in the optical axis direction.

12. The camera module of claim 11, wherein the second moving body comprises a first support bar disposed on a first external surface and a second support bar disposed on a second external surface opposite to the first external surface, and the second driving member comprises a first member configured to contact the first support bar to move the second moving body in the optical axis direction and a second member configured to contact the second support bar to move the second moving body in the optical axis direction.

13. A camera module, comprising:

a housing comprising an internal space;

a first moving body disposed in the internal space of the housing;

a second moving body disposed in an internal space of the first moving body;

a first driving member disposed in a space between the housing and the first moving body, and comprising a first driving wire formed of a shape memory alloy and a first curved elastic wire connected to both ends of the first driving wire; and a second driving member disposed in a space between the first moving body and the second moving body, and comprising a second driving wire formed of a shape memory alloy and a second curved elastic wire connected to both ends of the second driving wire, wherein the first curved elastic wire is in contact with the first moving body, and the second curved elastic wire is in contact with the second moving body, and wherein the first driving member comprises a driving member disposed in contact with a first internal surface of the housing and including the first driving wire and a driving member disposed in contact with a second internal surface of the housing connected to the first internal surface.

* * * * *